(12) United States Patent
Menasco, Jr.

(10) Patent No.: US 7,027,587 B2
(45) Date of Patent: Apr. 11, 2006

(54) SYSTEM AND METHOD FOR DERIVING SEALING CURRENT

(75) Inventor: Heyward E. Menasco, Jr., Hoover, AL (US)

(73) Assignee: BellSouth Intellectual Property Corp, Wilmington, DE (US)

( * ) Notice: Subject to any disclaimer, the term of this patent is extended or adjusted under 35 U.S.C. 154(b) by 342 days.

(21) Appl. No.: 10/366,338

(22) Filed: Feb. 14, 2003

(65) Prior Publication Data

US 2004/0161100 A1 Aug. 19, 2004

(51) Int. Cl.
*H04M 1/00* (2006.01)
*H04M 3/00* (2006.01)

(52) U.S. Cl. ............... 379/377; 379/27.05; 379/90.01; 379/93.01

(58) Field of Classification Search ......... 379/377–385
See application file for complete search history.

(56) References Cited

U.S. PATENT DOCUMENTS

| 5,208,846 | A | * | 5/1993 | Hammond et al. | 379/9.06 |
| 5,442,697 | A | * | 8/1995 | McGary et al. | 379/399.02 |
| 5,642,412 | A | * | 6/1997 | Reymond | 379/348 |
| 6,532,277 | B1 | * | 3/2003 | Ulanskas et al. | 379/27.01 |
| 6,647,117 | B1 | * | 11/2003 | Wallace et al. | 379/413 |

* cited by examiner

*Primary Examiner*—Sinh Tran
*Assistant Examiner*—Ramnandan Singh
(74) *Attorney, Agent, or Firm*—Withers & Keys, LLC (57) ABSTRACT

An adaptive unit that taps into an existing POTS line, DLC POTS line, DLC channel unit designed for sealing current outputs, or AC-DC transformer designed for sealing current output, to provide sealing current to a DSL circuit thereby avoiding having to deploy a separate sealing current unit to supply the desired sealing current to the DSL circuit. The adaptive unit, or sealing current derivation device, is preferably deployed at remote terminals thereby facilitating the offering of new DSL service, but may also be utilized in a central office.

21 Claims, 6 Drawing Sheets

SYSTEM AND METHOD FOR DERIVING SEALING CURRENT

BACKGROUND

1. Field of the Invention

The present invention relates generally to telecommunications networks and, more particularly, to employing sealing currents in such networks.

2. Background of the Invention

DSL (Digital Subscriber Line) technology provides high-speed data services over ordinary copper telephone lines. ADSL (Asymmetrical Digital Subscriber Line) is a type of DSL common for residential use. ADSL can download data much faster than it can upload data. SDSL (Symmetric Digital Subscriber Line) is a type of DSL service commonly made available to business users. Unlike ADSL, SDSL offers equal upload and download speeds. Types of SDSL service include SHDSL (Symmetric High Bit-rate Digital Subscriber Line) and EDSL (Enterprise Digital Subscriber Line), both of which are increasingly being offered to corporate users.

Figure 1:
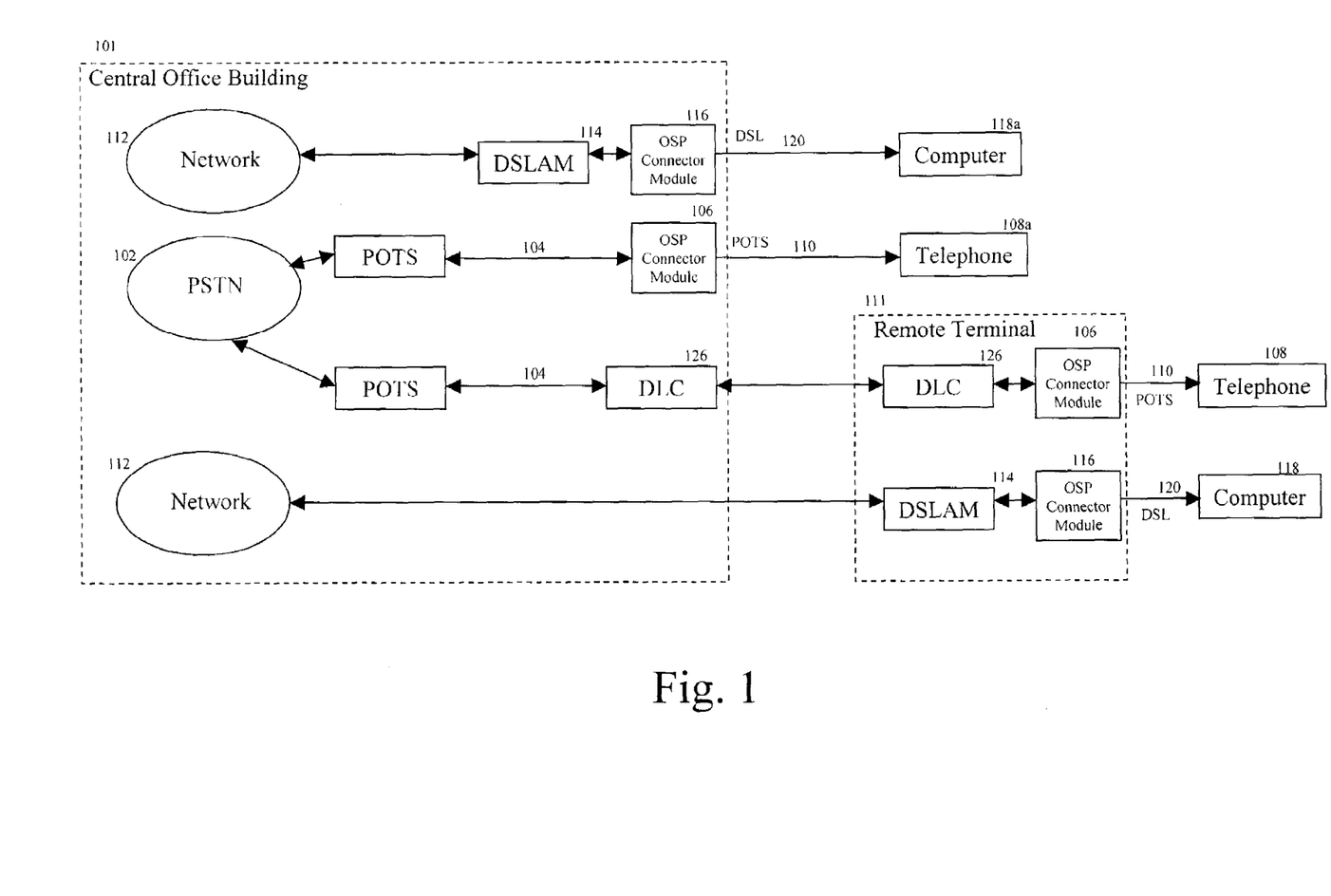
FIG. 1 is a high level schematic diagram of a POTS and DSL service implementation.

FIG. 1 illustrates a typical communication network architecture that provides SDSL services and POTS (Plain Old Telephone Service). FIG. 1 includes telephone user 108 and computer system 118. Computer system 118 may be any type of computer system capable of receiving and transferring data such as a personal computer or a main frame computer.

Telephone user 108 connects to OE (Office Equipment) 104 through connector module 106, via twisted-pair POTS line 110. Connector module 106 may be a lightning surge protector module. Connector module 106 may be located in a Central Office building 101 or a Remote Terminal enclosure 111. OE 104 connects telephone users 108 to the PSTN (Public Switched Telephone Network) 102 thereby providing well-known POTS functionality to customers.

Computer system 118a connects to DSLAM (DSL Access Multiplexer) 114 through connector module 116, via twisted-pair DSL service line 120. Connector module 116 may also be a lightning surge protector module. Connector module 116 and DSLAM 114 may be located in a central office building 101 or a Remote Terminal enclosure 111. DSLAM 114 connects computer system 118 to Network 112, such as the Internet, thereby providing DSL services to customers in a known fashion.

As is well-known in the art, OE 104 and DLC 126 both provide a sealing current that causes a small amount of DC current to flow through POTS lines 110. OE 104 may be a Line Port at the central office of PSTN 102 or a Line Port on the PSTN that is extended to a Remote Terminal enclosure 111 over a DLC system 126. Sealing current prevents corrosion build-up, reduces poor connections and noisy lines and improves overall transmission characteristics. Sealing current is a major contributor to telephone network reliability in the POTS arena.

In the DSL arena, however, and more particularly, in connection with SHDSL and EDSL services, the DSLAM that provides the SHDSL and EDSL services does not always have the capability of generating sealing current. Accordingly, when these DSL services are provided, a separate sealing current unit must be installed to provide and connect sealing current to the DSL twisted copper pair. When the DSLAM 114 is located in a Remote Terminal Enclosure 111, the addition of the sealing current unit must be co-located inside the corresponding remote enclosure, requiring mounting space and power, as commercially-available sealing current units are typically provided in the form of separate rack-mounted units. To complicate matters, particularly in the context of a large telecommunications service provider, an OSPE (Outside Plant Engineering) EWO (Engineering Work Order) is typically required to purchase physical plant devices such as sealing current units. Since sealing current units must be deployed before service is first made available from a RT (Remote Terminal) site, service to the customer may be unnecessarily delayed until after the EWO can be processed and the sealing current unit is purchased and installed.

Further, it is difficult to determine whether a given customer facility might require sealing current service. Thus, to ensure quality service and customer satisfaction, sealing current units are often preinstalled at all remote sites, thereby increasing cost, perhaps unnecessarily, to the telecommunications service provider.

SUMMARY OF THE INVENTION

To address the deficiencies of prior art sealing current implementations in the DSL arena, and to advantageously further the state of the art, the present invention provides a sealing current derivation option for DSL service by deriving desirable sealing current from existing resources by way of a unique circuit tapping or bridging configuration. As a result, the present invention reduces capital requirements to provide SDSL services, reduces delays in offering SDSL services, reduces engineering and construction efforts, and ensures quality customer service without providing devices that may or may not be required.

More specifically, the present invention provides an adaptive unit that taps into either existing POTS lines or DLC slots. In accordance with one embodiment, sealing current may also be derived from a common AC convenience outlet in combination with an AC-DC transformer.

In accordance with a method of the present invention, sealing current is supplied to a digital subscriber line (DSL) circuit by identifying a facility through which sealing current flows, identifying a DSL circuit for which sealing current is desired, and providing a bridging circuit, i.e., an adaptive unit, between the facility and the DSL circuit, whereby sealing current is supplied to the DSL line. The sealing current can be supplied by a POTS line, a DLC POTS line, a DLC channel unit with sealing current outputs, an AC-DC transformer or any other apparatus from which sealing current can be derived.

The present invention is also related to a method of obtaining sealing current from existing facilities by locating a POTS line that carries a DC sealing current, tapping into the POTS line on a telecommunications provider-side of a protector module, removing substantially all of any AC component being carried by the POTS line, and feeding the DC sealing current carried by the POTS line to another circuit such that the another circuit also carries a DC sealing current.

The present invention also provides an apparatus for deriving sealing current, comprising a sealing current derivation device having a first pair of connectors and a second pair of connectors, the first pair of connectors being electrically connected to a pair of conductors of a first circuit and the second pair of connectors being electrically connected to a pair of conductors of a second circuit, wherein the first circuit carries a sealing current whereas the second circuit does not carry a sealing current and both the first and second circuits are one of voice and data circuits, wherein the sealing current derivation device bridges the first and second circuits thereby supplying sealing current from the first circuit to the second circuit.

In several possible implementations, the present invention derives sealing current from one line and provides sealing current to the other line, wherein both lines are preferably operating telecommunications carrier lines.

In one embodiment of the present invention, sealing current is derived from a working POTS line. In another embodiment, the present invention derives sealing current from a specialized DLC channel unit. In still another embodiment, the present invention derives sealing current from an AC powered device installed on the customer's premises.

These and other aspects and advantages of the present invention will be apparent to those skilled in the art upon reading the following detailed description in conjunction with the associated drawings.

DETAILED DESCRIPTION OF THE INVENTION

Reference will now be made in detail to the preferred embodiments of the present invention, examples of which are illustrated in the accompanying drawings. While the present invention is described in embodiments directed to SHDSL services, it should be appreciated that the present invention may also be useful in providing sealing current in the context of other (DSL or other telecommunications) services.

Figure 2:
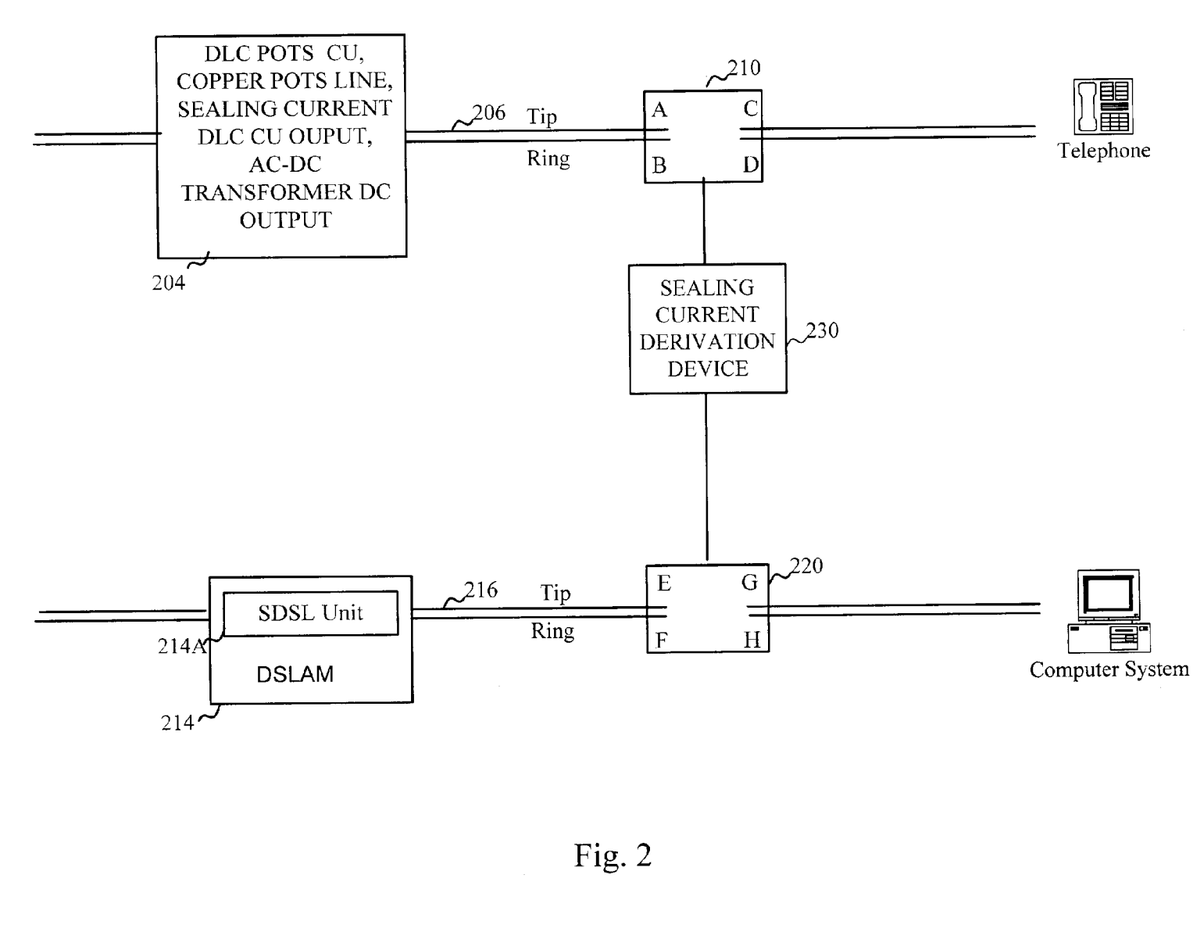
FIG. 2 shows a schematic configuration of a first embodiment of the present invention.

FIG. 2 illustrates a schematic block diagram of a system according to an embodiment of the present invention.

DLC 204 provides POTS service to customers (i.e., telephone users). DLC 204 is connected to DLC OSP connector module 210 via POTS line 206. DLC OSP connector module 210 may be, for example, a lightning protector module. It is noted, as shown in FIG. 2, that DLC 204, as a source of sealing current, can also be a standard copper POTS line, or a sealing current DLC channel unit (CU) port.

DSLAM 214 provides DSL services to a computer system. DSLAM 214 is connected to DSL OSP connector module 220 via DSL line 216. DSL OSP connector module 220 may also be, for example, a lightning protector module. DSLAM 214 includes DSL unit 214A, for example, a SHDSL unit for providing SDSL services.

In accordance with an embodiment of the present invention, a sealing current derivation device 230 derives available sealing current from POTS line 206 and bridges POTS line 206 and DSL line 216, thereby feeding sealing current to DSL line 216. In one possible implementation, sealing current derivation device 230 is connected between DLC OSP connector module 210 and DSLAM OSP connector module 220. In another possible implementation, sealing current derivation device 230 may be incorporated into one of the protector modules 210, 216 (albeit with wires still interconnecting the two separate paths 206 and 216). In other words, sealing current derivation device 230 may be incorporated into a well-known snap-in type protector module.

Figure 3:
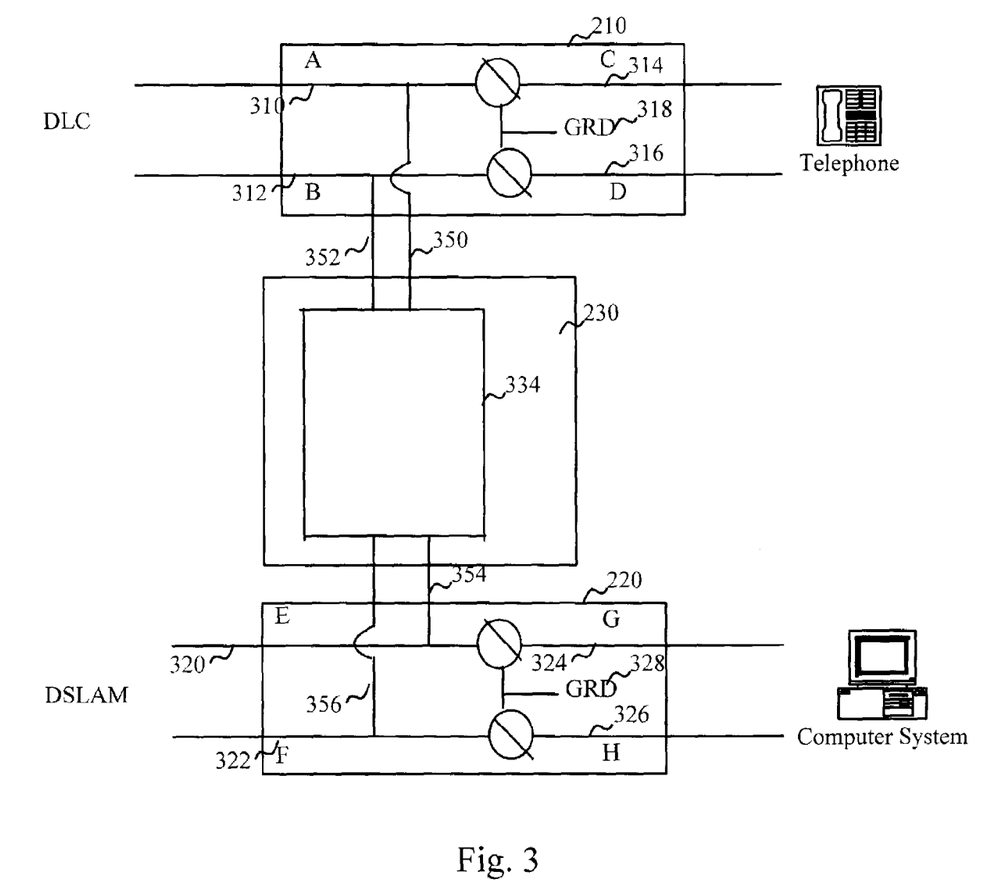
FIG. 3 shows an exemplary circuit diagram according to the first embodiment of the present invention.

FIG. 3 shows a circuit diagram of main components of DLC OSP connector module 210, DSLAM OSP connector module 220 and sealing current derivation device 230 according to an embodiment of the present invention.

DLC OSP connector module 210 consists of five connection lines: tip A 310 and ring B 312 for connecting to DLC 204, tip C 314 and ring D 316 for connecting POTS telephone line, and GRD 318 for connecting to ground.

Similarly, DSLAM OSP connector module 220 consists of five connection lines: tip E 320 and ring F 322 for connecting to DSLAM 214, tip G 324 and ring H 326 for connecting to the computer system, and GRD 328 for connecting to ground.

Sealing current derivation device 230 preferably includes appropriate circuitry 334 for removing any AC component from POTS line 206 (i.e., tip and ring 310, 312). Circuitry 334 preferably also includes any necessary impedance matching circuitry, current limiters, and POTS line isolation circuitry; all of which are well-known in the telephony art.

As shown, sealing current derivation device 230 is connected to DLC OSP connector module 210 such that sealing current derivation device 230 bridges tip A 310 via wire 350 and ring B 312 via wire 352 to tip E 320 via wire 354 and ring F 322 via wire 356.

With the bridging circuitry depicted in FIG. 3 that is provided by sealing current derivation device 230, it is possible to provide desirable sealing current to DSL service line 216 without having to install a separate sealing current device to service the DSL line 216.

Figure 4:
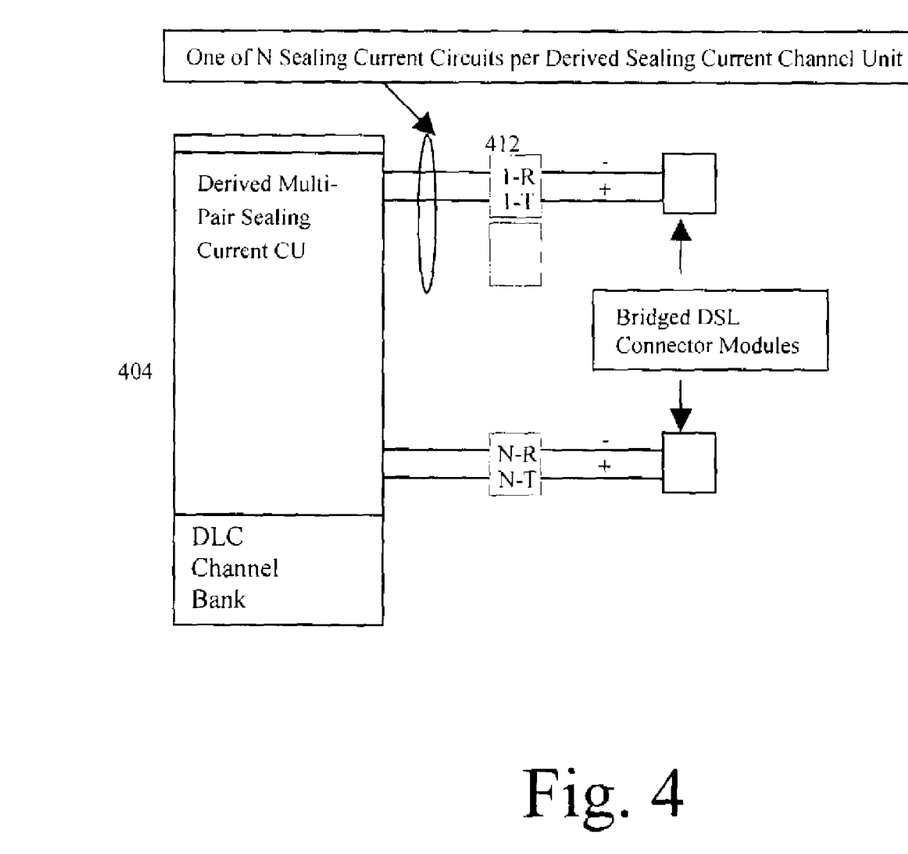
FIG. 4 shows a schematic diagram according to a second embodiment of the present invention.

FIG. 4 shows a schematic diagram according to a second embodiment of the present invention. Sealing current device 404 is provided as a plug-in circuit module to a conventional rack-mounted DLC channel bank. Sealing current device 404 may include multiple sealing current circuits whereby sealing current is provided to a plurality of DSL lines. In a typical use, sealing current device 404 is inserted in a slot of conventional DLC channel unit 402.

Figure 4A:
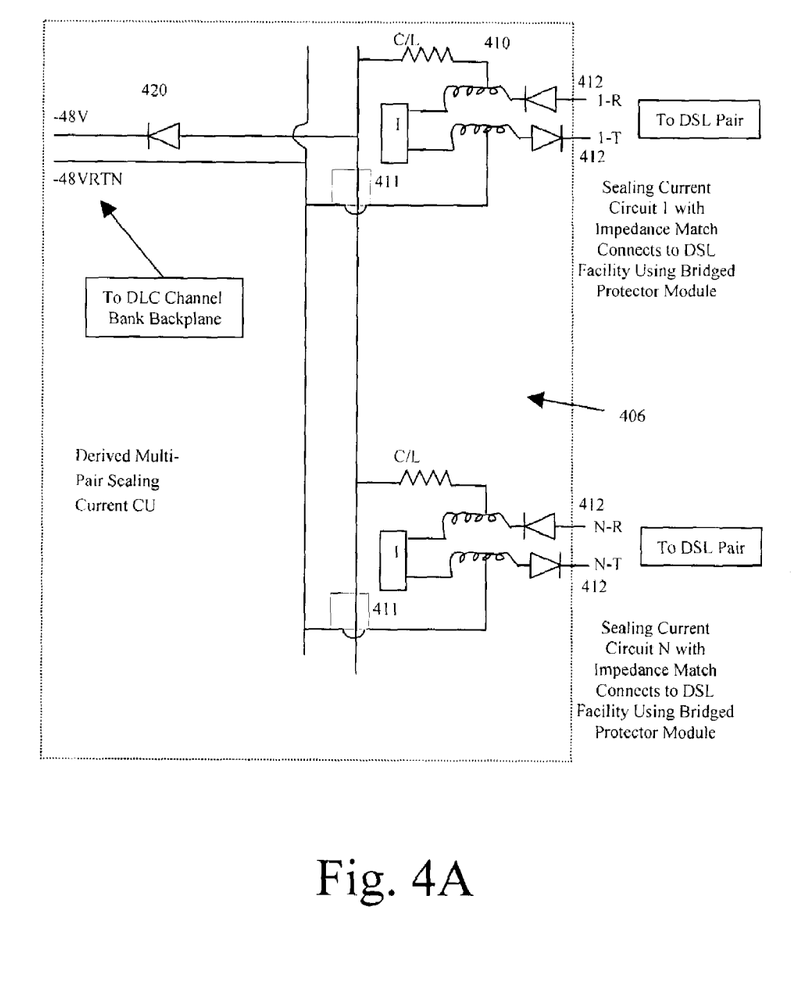
FIG. 4A shows a circuit diagram of main components of a sealing current device according to the second embodiment of the present invention.

FIG. 4A shows a circuit diagram of main components of sealing current device 404 according to the second embodiment of the present invention. In FIG. 4A, sealing current device 404 includes N number of sealing current circuits, wherein each of the sealing current circuits consists of a single twisted-pair line. More specifically, sealing current circuit 406 consists of twisted-pair lines 412. Each line 412 provides a source of sealing current. Thus, as is readily seen in FIG. 4A sealing current circuit 406 provides sealing current on a pair of wires 412 similar to sealing current provided on a POTS or DLC POTS lines 206. Sealing current circuit 406 may also include, as appropriate, current limiting resistor 410 to limit the amount of sealing current that is fed to any selected circuit and impedance matching circuit 411.

Sealing current derivation device 230 can then be connected to sealing current circuit 412, as an alternative to connecting sealing current derivation device 230 to a POTS or DLC POTS line 206, to derive the sealing current for the DSL service line 216 without having to install a traditional sealing current unit.

Figure 5:
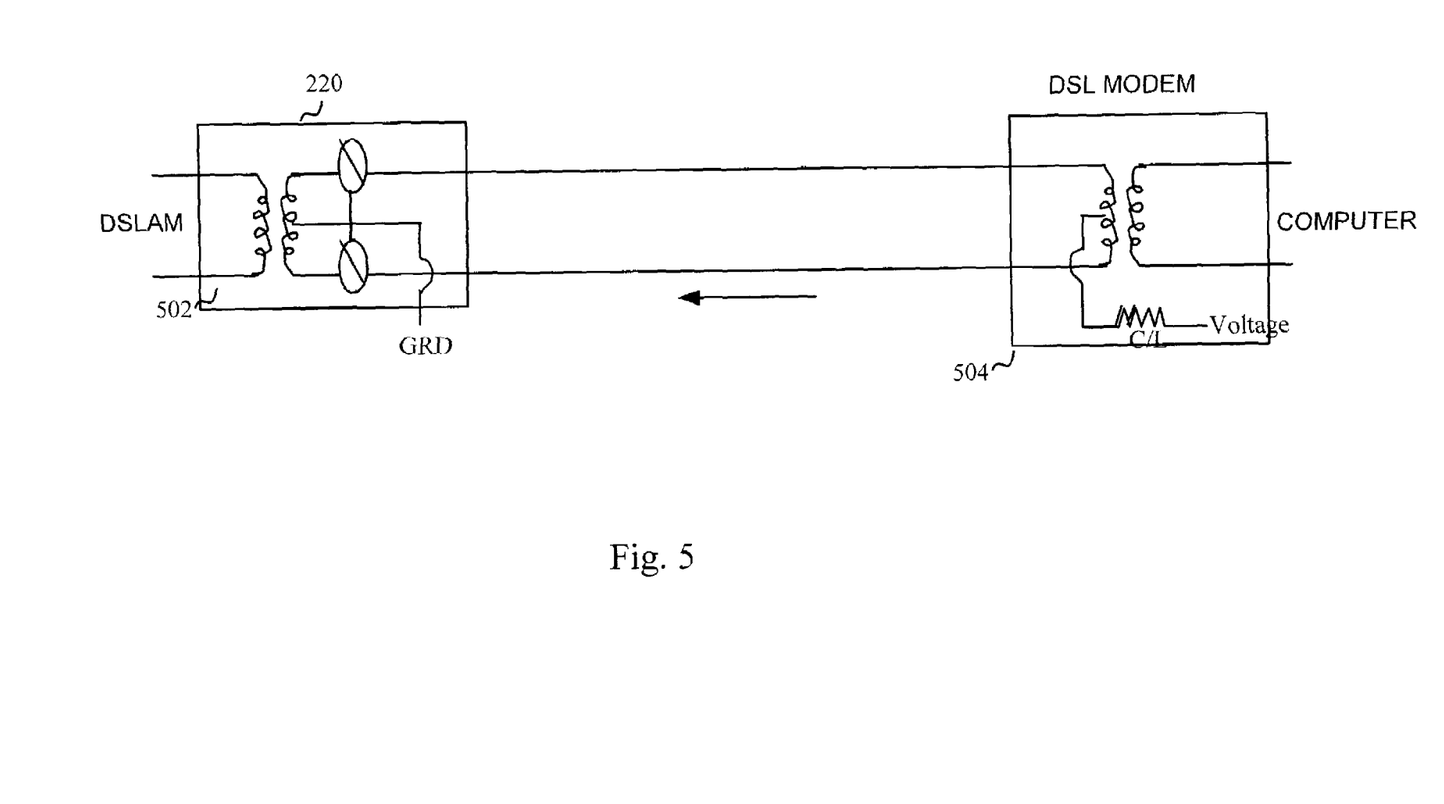
FIG. 5 shows a circuit diagram of main components of a sealing current device according to a third embodiment of the present invention.

FIG. 5 shows a circuit diagram of main components of a sealing current device according to a third embodiment of the present invention. In this embodiment, sealing current is derived from a device located on the customer's premises. Here, the device is an AC-DC transformer 504 that may be provided within a customer-side modem. In this case, sealing current will actually flow in a direction opposite to the conventional direction. That is, unlike the two previous embodiments (and conventional POTS line sealing current) where sealing current is sourced from the telecommunications provider facilities, the sealing current in this embodiment is sourced from the customer premises and fed in the direction of a remote terminal 502 or similar facility.

As shown, an AC-DC transformer, located externally, or internally inside the customer's computer modem, provides the sealing current to the DSL OSP twisted pair wires between the customer's DSL modem and the DSLAM's OSP connector module 502. The lightning surge arrestor installed in the DSLAM's OSP connector module 502 will include the circuitry necessary to provide a path to ground the sealing current and pass through the DSL signal, as well as provide the DSLAM equipment with foreign voltage and lighting protection.

In yet another embodiment, the AC-DC transformer can be designed to provide one or more sources of DC sealing current similar to DLC CU derived sealing current unit 404, described as the second embodiment of the present invention. The AC-DC transformer can be installed at either the customer or the telephone company location. The AC-DC transformer provides the source of the sealing current on a pair of wires, with the same characteristics as described for DLC channel unit derived sealing current circuit 412.

Derived sealing current device 230 can be used to bridge the DC sealing current provided by the AC-DC transformer circuit to the DSL line as another option for bridging the sealing current to a POTS line. This alternative also eliminates the need to install a traditional sealing current device.

As will be appreciated by those skilled in the art, the present invention can be used in remote solutions environments to enable optional application of sealing current on Non-Switched Special Service lines, ISDN lines and SDSL lines.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of supplying sealing current to a digital subscriber line (DSL) circuit, comprising the steps of:
   identifying a plain old telephone service (POTS) transmission line to a first destination through which flows sealing current;
   identifying a DSL circuit to a second destination for which sealing current is desired; and
   providing a bridging circuit between the transmission line to a first destination and the DSL circuit, thereby providing sealing current to the DSL circuit to the second destination while continuing to provide sealing current through the transmission line to the first destination.

2. The method of claim 1, wherein the DSL circuit is an HDSL circuit.

3. The method of claim 1, wherein the DSL circuit is synchronous.

4. The method of claim 1, wherein the bridging circuit is associated with a protector module.

5. The method of claim 1, wherein the bridging circuit is incorporated, at least partially, into a protector module.

6. The method of claim 1, wherein the bridging circuitry is provided in a remote terminal.

7. The method of claim 1, wherein the bridging circuit is operable to at least one of: match circuit impedance, limit current, and isolate the DSL line from the facility.

8. A method of obtaining sealing current from existing facilities, comprising the steps of:
   locating a facility that carries a DC sealing current in a plain old telephone service (POTS) transmission line to a first destination;
   tapping into the transmission line to the first destination on a telecommunications provider-side of a protector module;
   removing substantially all of any AC component being carried by the transmission line to the first destination; and
   feeding at least a portion of the DC sealing current carried by the transmission line to the first destination to a digital subscriber line (DSL) circuit transmission line to the second destination while continuing to provide sealing current through the transmission line to the first destination.

9. The method of claim 8, further comprising physically tapping into the transmission line to the first destination at a location corresponding to a physical location of the protector module.

10. The method of claim 8, further comprising at least one of: matching circuit impedance, limiting current, and isolating the another circuit from the facility.

11. The method of claim 9, wherein the DSL circuit is at least one of an asymmetrical DSL circuit and a symmetrical DSL circuit that is not combined on the same facility as a POTS line.

12. A sealing current derivation apparatus comprising:
   a first pair of connectors electrically connected to a pair of conductors of a plain old telephone service (POTS) transmission line to a first destination carrying a sealing current to a first destination; and
   a second pair of connectors electrically connected to a pair of conductors of a digital subscriber line (DSL) circuit transmission line to a second destination not carrying a sealing current wherein both the transmission lines to the first and second destinations are at least one of a voice and a data circuit, wherein further the sealing current derivation device bridges the transmission line to the first destination and the transmission line to the second destination while sealing current continues to be provided through the transmission line to the first destination.

13. The apparatus of claim 2, wherein the DSL Line comprises a synchronous DSL line.

14. The apparatus of claim 12, wherein all electrical connections associated with the sealing current derivation apparatus are established on a telecommunications provider-side of a protector module.

15. The apparatus of claim 12, wherein the sealing current derivation apparatus comprises circuitry to at least one of match circuit impedance, limit current, and isolate the transmission line to the second destination from the transmission line to the first destination.

16. The apparatus of claim 12, wherein the apparatus is implemented on a card that can be mounted in a digital 100 p carrier channel bank.

17. The apparatus of claim 12, wherein at least a portion of the sealing current derivation apparatus is incorporated into a protector module.

18. A method of providing sealing current to a transmission line to a second destination comprising:
   deriving a sealing current from a device located at the customer end of a plain old telephone service (POTS) transmission line to a first destination; and
   applying the sealing current that is derived from the transmission line to the first destination to a digital subscriber line (DSL) circuit transmission line to the second destination, wherein the transmission line to the second destination is arranged to preclude the sealing current from passing into a telecommunications provider internal facilities.

19. The method of claim 18, wherein the step of deriving comprises deriving the sealing current from an AC-DC converter.

20. The method of claim 18, further comprising employing a connector module to preclude the sealing current from passing into a telecommunications provider internal facilities.

21. The method of claim 18, wherein the internal facilities comprise a DSLAM.

* * * * *